United States Patent [19]
Jung

[11] Patent Number: 5,109,478
[45] Date of Patent: Apr. 28, 1992

[54] CIRCUIT FOR GENERATING A SQUARE TEST PATTERN IN A PAGE PRINTER

[75] Inventor: Kwang-Young Jung, Suwon, Rep. of Korea

[73] Assignee: SamSung Electronics Co., Ltd., Suwon, Rep. of Korea

[21] Appl. No.: 636,398

[22] Filed: Dec. 31, 1990

[30] Foreign Application Priority Data

Mar. 20, 1990 [KR] Rep. of Korea ............... 1990-3754

[51] Int. Cl.$^5$ ............................................. G06K 15/00
[52] U.S. Cl. .................................... 395/112; 355/204; 395/117
[58] Field of Search ............... 364/519, 520, 235 MS, 364/930 MS; 400/103; 355/203, 204, 209; 346/154; 358/296, 467, 443

[56] References Cited

U.S. PATENT DOCUMENTS 4,661,001 4/1987 Takai et al. .................... 400/103
4,860,119 8/1984 Maniwa et al. ............... 358/296

Primary Examiner—Arthur G. Evans
Attorney, Agent, or Firm—Robert E. Bushnell

[57] ABSTRACT

There is provided a circuit for generating a square test pattern including: a clock pulse generator for generating clock pulses; a frequency demultiplier for dividing the clock pulses of the clock pulse generator by eight in order to minimize errors in synchronism; a longitudinal line generator for receiving the divided clock pulses of the frequency demultiplier to generate longitudinal line printing data and a printing start and end signals; a printing area establishing unit for receiving a printing start and end signals of a line output from the longitudinal line generator to establish the printing and end points by the clock pulses of the frequency demultiplier; a synchronizing signal generator for synchronizing horizontal synchronizing signals by the divided clock pulses of the clock pulse generator to generate load signals of the longitudinal line generator and transverse line clock pulses; a transverse line generator for receiving the transverse line clock pulses of the synchronizing signal generator to generate transverse line printing data; and a square pattern generator for receiving the output signals of the transverse and longitudinal line generator to generate square pattern printing data by the output signal of the printing area establishing unit.

12 Claims, 3 Drawing Sheets

CIRCUIT FOR GENERATING A SQUARE TEST PATTERN IN A PAGE PRINTER

BACKGROUND OF THE INVENTION

The present invention concerns a page printer, and particularly a circuit for generating a square test pattern to test a test pattern with transverse and longitudinal lines, the linearity, and the transverse and longitudinal jitters, etc.

Generally, a page printer is used as means for assisting a computer in printing the data processed by the computer on a paper. Conventionally, an engine itself of the printer cannot generate the square test pattern, and instead employs an engine test pattern having longitudinal lines. In order to generate the square test pattern, the engine must be combined with the controller.

SUMMARY OF THE INVENTION

The object of the present invention is to provide a circuit for generating a square test pattern for use in a page printer, wherein the engine may itself perform the square test without a controller.

According to one aspect of the present invention, a circuit for generating a square test pattern comprises: a clock pulse generator for generating clock pulses; a frequency demultiplier for dividing by eight the clock pulses generated from the clock pulse generator in order to minimize errors in synchronizing operation; a longitudinal line generator for receiving the divided clock pulses of the frequency demultiplier to generate longitudinal line printing data; a printing area establishing unit for receiving a printing start and end signals of a line outputted from the longitudinal line; generator to establish the printing start and end points by the clock pulses from the frequency demultiplier; a synchronizing signal generator for synchronizing horizontal synchronizing signals with the clock pulses from the clock pulse generator to generate load signals of the longitudinal line generator and transverse line clock pulses; a transverse line generator for receiving the transverse line clock pulses of the synchronizing signal generator to generate transverse line printing data; and a square pattern generator for receiving the output signals of the transverse and longitudinal line generator to generate square pattern printing data by the output signal of the printing area establishing unit.

BRIEF DESCRIPTION OF THE ATTACHED DRAWINGS

For a better understanding of the invention and to illustrate how the same may be carried into effect, reference will now be made, by way of example, to the accompanying diagrammatic drawings, in which:

FIG. 1 is a circuit diagram of the present invention;
FIG. 2 shows the operational waveforms of FIG. 1; and
FIG. 3 is a square printing pattern according to the present invention.

DETAILED DESCRIPTION OF THE PREFERRED EMBODIMENT

Figure 1:
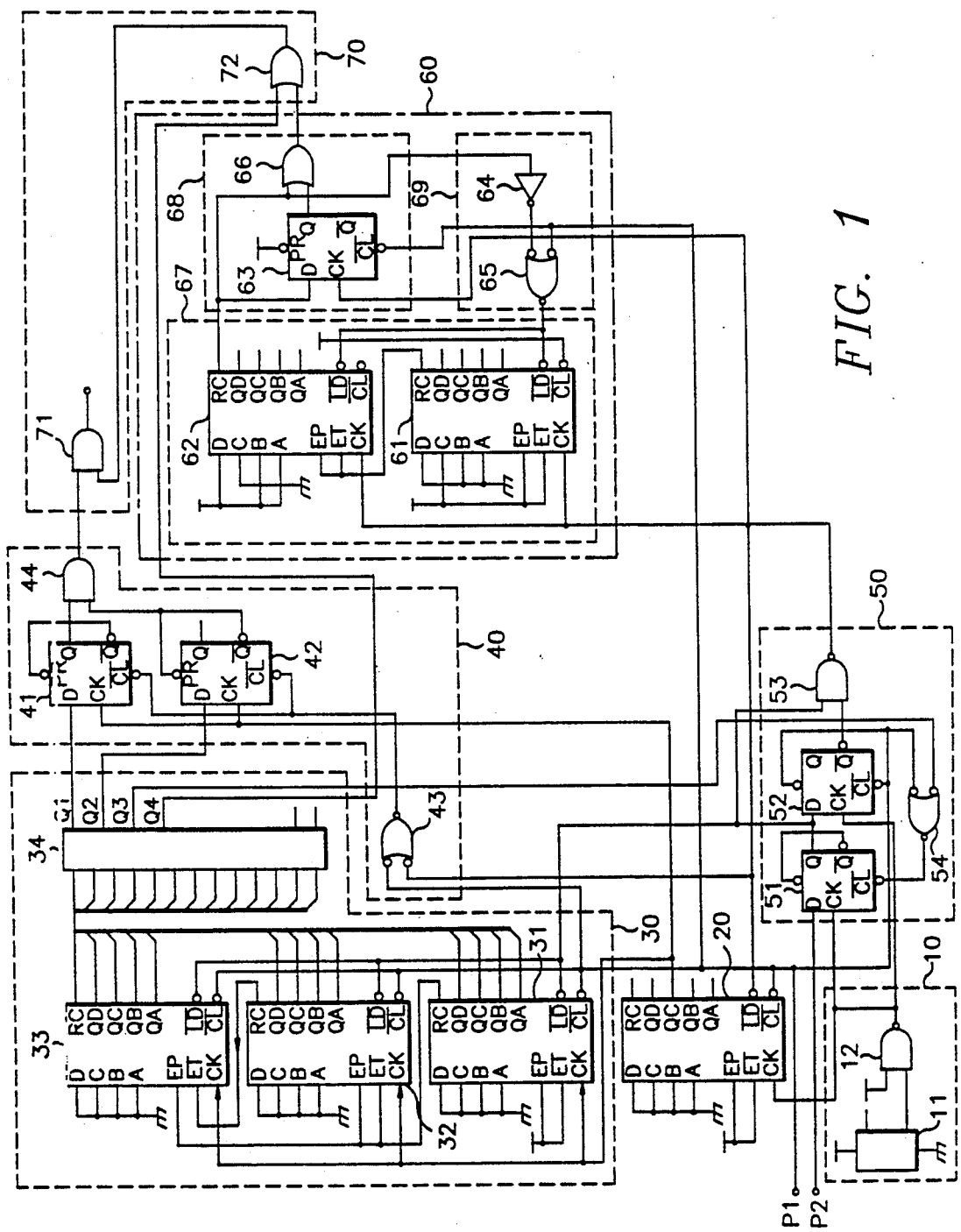

Referring to FIG. 1, a clock pulse generator 10 generates clock pulses. A frequency demultiplier 20 divides the clock pulses of the clock pulse generator 10 by eight in order to minimize errors in synchronism. A longitudinal line generator 30 receives the divided clock pulses of the frequency demultiplier to generate longitudinal line printing data. A printing area establishing circuit 40 receives printing start and end signals of a line from the longitudinal line generator to establish the printing start and end points by the clock pulses of the frequency demultiplier 20. A synchronizing signal generator 50 synchronizes the horizontal synchronizing signal of the clock pulses of the clock pulse generator so as to generate the load signal of the longitudinal line generator and transverse line clock pulses. A transverse line generator 60 receives the transverse line clock pulses of the synchronizing signal generator to generate transverse line printing data. A square pattern generator 70 receives the output signals of the transverse and longitudinal line generators to generate square pattern printing data by the output signal of the printing area.

The longitudinal line generator 30 includes a first counter 31, a second counter 32, a third counter 33, and a programmable array logic (PAL) 34. The first counter 31 counts the divided clock pulses of the frequency demultiplier 20 to produce a carry signal. The second counter 32 is subconnected to the carry terminal of the first counter 31, and counts the divided clock pulses of the frequency demultiplier to produce a carry signal. The third counter 33 is subconnected to the carry terminal of the second counter 32, and counts the divided clock pulses of the frequency demultplier 20. The PAL 34 decodes the counting signals of the first to third counters 31 to 33 so as to produce a printing start and end signals of each line, and longitudinal line pattern generating signal.

The printing area establishing circuit 40 includes two flip-flops 41 and 42 and two AND gates 43 and 44. The flip-flop 41 receives the printing start signal Q1 of the PAL 34 to establish the printing start point by the divided clock pulses of the frequency demultiplier 20. The signal representing the printing start point is provided through terminal Q. The flip-flop 42 receives the printing end signal Q2 of the PAL 34 to establish the printing end point by the divided clock pulses of the frequency demultiplier 20. The signal representing the printing end point is provided through terminal Q. The AND gate 43 receives the printing start signal and the output signal of the frequency demultiplier 20 to clear the flip-flops 41 and 42. The AND gate 44 receives the outputs Q, $\overline{Q}$ of the flip-flops 41 and 42.

The synchronizing signal generator 50 includes two flip-flops 51 and 52, a NAND gate 53, and a NOR gate 54. The flip-flop 51 has a data terminal D for receiving the horizontal synchronizing signal, a clock terminal CK for receiving the output signal of the clock pulse generator 10, and an output terminal Q for outputting the load signal to the longitudinal line counters 31-33, to control the input period of the counters 31-33 to 256-dot clock pulse period. The second flip-flop 52 has a data terminal D for receiving the output signal Q of the flip-flop 51, and a clock terminal CK for receiving the output signal of the clock pulse generator 10. The NAND gate 53 has two input terminals coupled respectively to the output terminals Q, $\overline{Q}$ of the flip-flops 51 and 52, producing the clock pulses for generating the longitudinal lines. The NOR gate 54 receives the output signal Q3 of the PAL 34 and the printing start signal to produce a clear signal.

The traverse line generator 60 includes a fourth counter 61, a fifth counter 62, an inverter 64, a NOR gate 65, a flip-flop 63, and an OR gate 66. The fourth counter 61 has a clock terminal CK for receiving the output signal of the NAND gate 53, producing a carry signal. The fifth counter 62 is subconnected to the carry terminal of the fourth counter 61 with a clock terminal CK receiving the output signal of the NAND gate 53, producing a carry signal. The inverter 64 inverts the carry signal of the fifth counter 62. The NOR gate 65 receives the inverted carry signal of the inverter 64 and the printing start signal, producing the load signals of the fourth and fifth counters 61 and 62 so as to control the clock pulse period of the counters 61 and 62 to 256-dot clock pulse period. The flip-flop 63 has a data terminal D for receiving the carry signal of the fifth counter 62 and a clock terminal CK for receiving the output signal of the NAND gate 53, producing a traverse two-dot line. The OR gate 66 receives the output signal Q of the flip-flop 63 and the carry signal of the fifth counter 62, producing traverse line printing data.

The square pattern generator 70 includes an OR gate 72 and an AND gate 71. The OR gate 72 receives the transverse line printing data of the OR gate 66 and the longitudinal line printing data of the PAL 34 to produce the square pattern printing data. The AND gate 71 is to output the square printing data of the OR gate 72 within the printing start and end points from the AND gate 44.

Figure 2:
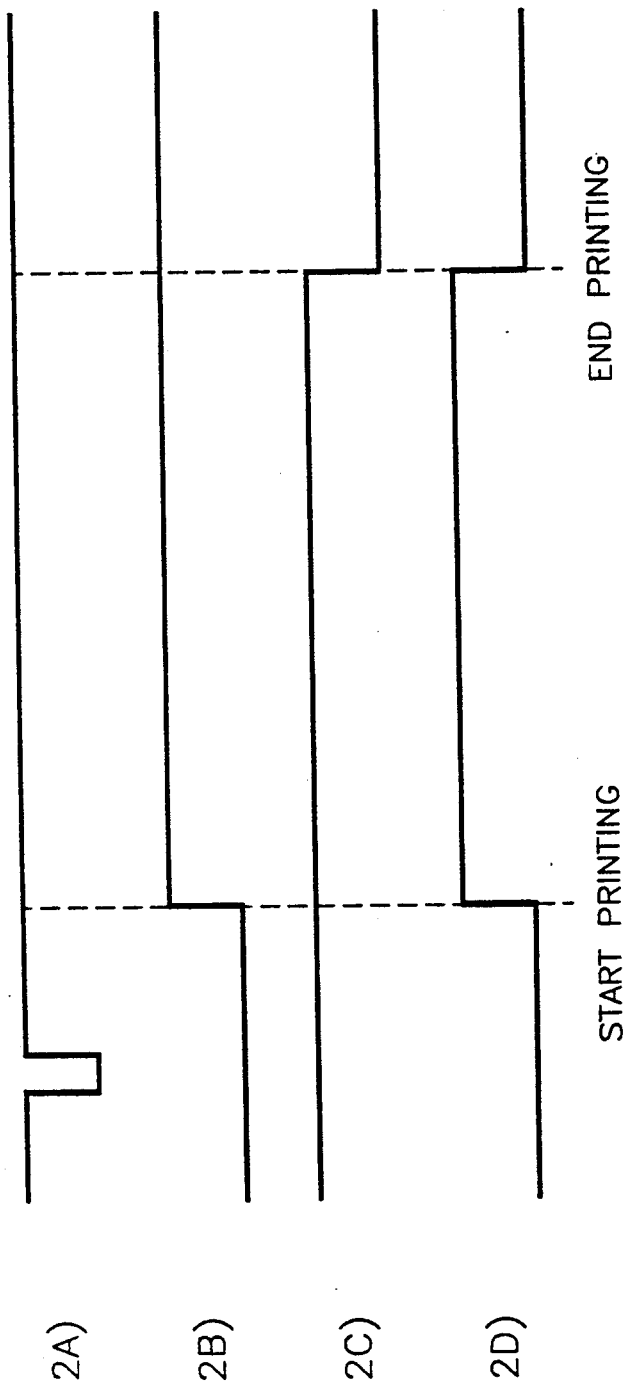
Figure 3:
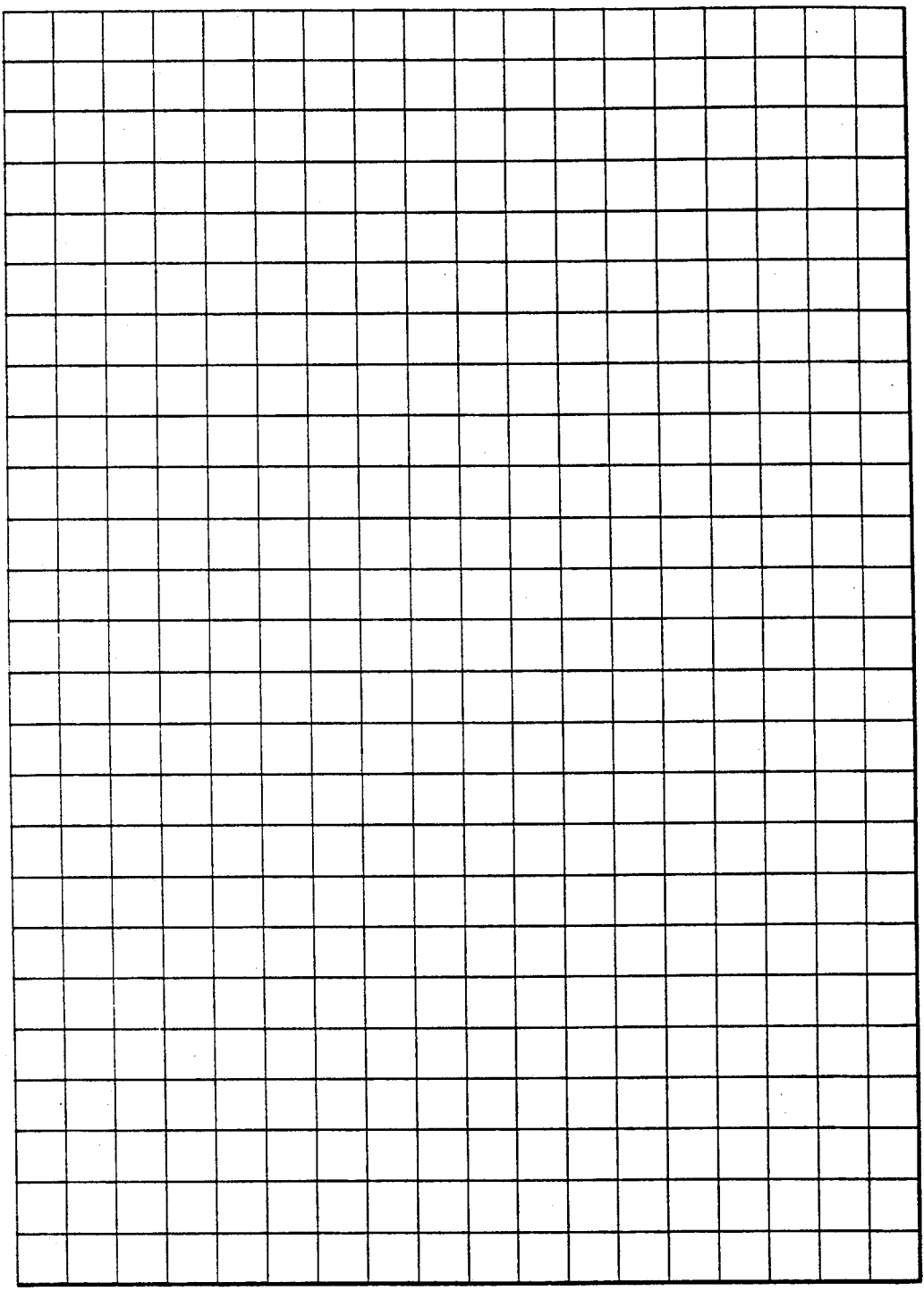

With reference to FIGS. 1-3, the operation of the inventive circuit will now be described.

The number of the clock pulses of the clock pulse generator 10 is eight times the number of the reference scanning clock pulses. The clock pulses of the clock pulse generator 10 are divided by eight in the frequency demultiplier 20. The divided clock pulses are to minimize errors in synchronism such as a jitter, etc. The first counter 31 counts the divided clock pulses of the frequency demultiplier received through the clock terminal CK, and outputs the counted value through the output terminals QA-QD and the carry signal through the carry terminal RC. The carry signals of the first counter 31 is delivered to the operating control terminals ET, EP of the second counter 32, which counts the video clock pulses from the frequency demultiplier 20, and produces the counted value through the output terminals QA-QD and the carry signal through the carry terminal RC.

The carry signals of the first and second counters 32-33 are delivered to the operation control terminals ET, EP of the third counter 33, which counts the video clock pulses of the frequency demultiplier 20 to produce the counted value through the output terminals QA-QD.

The PAL 34 decodes the output signals of the first to third counters 31-33 to produce the printing start signal through the output terminal Q1, the printing end signal through the output terminal Q2, a line clear signal through the output terminal Q3 and the longitudinal line printing data as shown in FIG. 3 through the output terminal Q4. In order to obtain the longitudinal line through Q4 of the PAL 34, ¼ inch spacing is formed. Since ¼ inch is "4B" in the Hexa value, the PAL is adjusted to generate a low signal when the spacing is 4B.

The signal through the terminal Q1 of the PAL 34 is delivered to the data terminal D of the flip-flop 41 that establishes the printing start point by the video clock pulses of the frequency demultiplier 20 so as to produce a signal as illustrated in 2B of FIG. 2. Also, the signal through the terminal Q2 of the PAL 34 is delivered to the data terminal D of the flip-flop 42 which establishes the printing end point by the video clock pulses of the frequency demultiplier 20 so as to produce a signal, as illustrated in 2C of FIG. 2.

The AND gate 44 receives the output signals of the flip-flops 41 and 42 to produce a practical printing array signal as illustrated in 2D of FIG. 2. The signal through the output terminal Q3 of the PAL 34 and the printing star signal inputted through the input terminal P1 are delivered to the NOR gate 54 that produces a clear signal to disable the flip-flop 51 for a given time until the start of the next line after the effective printing array.

The horizontal synchronizing signal, as illustrated in 2A of FIG. 2, through the input terminal P2, is delivered to the data terminal D of the flip-flop 51 that is synchronized by the clock pulses of the clock pulse generator 10, to provide the load signals of the first to third counters 31-33 through the output terminal Q as well as the horizontal synchronizing signal for generating the clock pulses of the longitudinal lines. The load signal is to control the first to third counters 31-33 in 256-dot clock pulse period.

The signal outputted through the output terminal Q of the flip-flop 51 is delivered to the data terminal D of the flip-flop 52 that is synchronized by the clock pulses of the clock pulse generator to produce a signal through the terminal Q. The NAND gate 53 receives the signals through the output terminals Q, Q̄ of the flip-flops 51 and 52 so as to produce the longitudinal line clock pulses for synchronizing the video clock pulses by the horizontal synchronizing signal. The fourth counter 61 counts the signals input through the clock terminal CK thereof from the NAND gate 53 to produce the counted value through the output terminals QA-QD and the carry signal through the carry terminal RC. The fifth counter 62 counts the carry signal of the fourth counter 61 input through the operational control terminals ET, EP thereof by the clock pulses of the NAND gate 53 to produce the carry signal through the carry terminal RC, thus generating the transverse line printing data as illustrated in FIG. 3. The transverse line printing data output through the carry terminal RC of the fifth counter 62 is delivered to the OR gate 66. The carry signal of the fifth counter 62 is delivered to the data terminal of the flip-flop 63 that is synchronized by the clock pulses output from the NAND gate 53 to produce two-dot line. The transverse one-dot line output through the carry terminal of the fifth counter 62 and two-dot line outputted from the flip-flop 63 are delivered to the OR gate 66 to produce the transverse line printing data. The longitudinal line printing data output through the output terminal Q4 of the PAL 34, and the transverse line printing data of the OR gate 66, are delivered to the OR gate 72 to produce the transverse and longitudinal line square printing patterns, as illustrated in FIG. 3. The AND gate 71 receives the transverse and longitudinal square printing pattern signal output from the OR gate 72 and the printing array establishing signal of the AND gate 44 so as to produce the printing data. The carry signal of the fifth counter 62 is delivered through the inverter 64 to one input of the NOR gate 65. The NOR gate 65 receives the inverted carry signal and the printing start signal of the input terminal P1 so as to provide the load signals of the fourth and fifth counters 61 and 62, so that the input period of the fourth and fifth counters is controlled to 256-dot clock pulse period.

The fourth and fifth counters 61 and 62 are established to 5V or ground without input from ¼ inch line, so that the Hexa value 4B corresponding to ¼ inch is set to the value corresponding to "256-4B" by using the carry signal of 256 counter consisting of the fourth and fifth counters 61 and 62. Namely, establishing the initial value at 4B, the carry signal is produced after 4B, thus generating dot output.

As mentioned above, the inventive circuit generates the transverse and longitudinal test lines without the controller, and establishes the printing start and end points in a paper, so as to generate the square test pattern, thus making it possible the test of the engine and picture quality.

All specific constructions and procedures of the invention have been illustrated and described herein, it is not intended that the invention be limited to the elements and constructions disclosed. One skilled in the art will recognize that the particular elements or subconstructions may be used without departing from the scope and spirit of the invention.

What is claimed is:

1. A circuit for generating a square test pattern of a page printer, comprising:
   clock pulse generating means for generating clock pulses;
   means for providing a divided clock pulses from said clock pulse generating means for minimizing errors in synchronism with reference scanning clock pulses;
   longitudinal line generating means for receiving said divided clock pulses to generate a printing start and end signals, a line clear signal, and the longitudinal line printing data;
   printing area establishing means for receiving the printing start and end signals said divided clock signals to establish a printing start and end points of a printing area;
   synchronizing means for receiving a horizontal synchronizing signal to provide synchronization with the clock pulses of said clock pulse generating means to generate load signals to said longitudinal line generating means and transverse line clock pulses;
   transverse line generating means for receiving said transverse line clock pulses of said synchronizing signal generating means to generate the transverse line printing data and
   square pattern output means for receiving said longitudinal line printing data and said traverse line printing data to generate square pattern printing data within the perimeter of said printing start and end points of said printing area.

2. A circuit for generating a square test pattern as claimed in claim 1, wherein said longitudinal line generating means comprises:
   plural counter means for receiving the divided clock pulses for counting said divided clock pulses to produce a plurality of counted values and a carry signal; and
   logic means for decoding the counted values of said plural counter means to produce the printing start and end signals of the printing line, a line clear signal, and the longitudinal line printing data.

3. A circuit for generating a square test pattern as claimed in claim 1, wherein said transverse line generating means comprises:
   a counter means for receiving the traverse line clock pulses for counting said traverse line clock pulse the output of said synchronizing signal generating means to produce a carry signal;
   load signal generating means for receiving said carry signal and a printing start signal to product the load signals of controlling the clock period of said counter means; and
   dot line generating means for receiving said carry signal and said traverse line clock pulse to produce the traverse line printing data.

4. A circuit for generating a square test pattern as claimed in claim 1, wherein said longitudinal line generating means comprises:
   first counter means for receiving the divided clock pulses and for counting said divided clock pulses to produce a counted value and a carry signal;
   second counter means for receiving said divided clock pulses and said carry signal for counting said divided clock pulses to produce a second counted value and a second carry signal;
   third counter means for receiving said divided clock pulses and said first and second carry signals for counting said divided clock pulses to produce a third counted value; and
   programmable array logic means for decoding the counted values produced by said first, second and third counter to generate a printing start signal, a printing end signal, a line clear signal, and the longitudinal line printing data.

5. A circuit for generating a square test pattern as claimed in claim 1, wherein said transverse line generating means comprises:
   first counter means for receiving the traverse line clock pulse and for counting said traverse line clock pulse to produce a carry signal;
   second counter means for receiving said traverse line clock pulse and said carry signal for counting said traverse line clock pulse to produce a second carry signal;;
   inverter means for providing an inverted second carry signal;
   logic means for receiving said inverted second carry signal and a printing start signal to produce the load signals for controlling the clock pulse period of the first and second counter means;
   flip-flop means for receiving said traverse line clock pulse and said second carry signal to produce a two-dot line; and
   means for receiving said second carry signal and said two-dot line to produce the traverse line printing data.

6. A circuit for generating a square test pattern for a page printer, comprising:
   clock pulse generating means for generating clock signals;
   means for providing first intermediate clock signals in dependence upon said clock signals;
   synchronizing means for receiving a horizontal synchronizing signal and said clock signals to generate load signals and second intermediate clock signals;
   first conversion means for receiving said load signals and said first intermediate clock signals to control the clock period of said first conversion means and generate a line clear signal, the longitudinal line printing data, and a printing start and end signals for establishing a printing start and end points of a printing area;
   second conversion means for receiving said second intermediate clock signals to generate the transverse line printing data; and square pattern output means for receiving said longitudinal line printing data and said traverse line printing data to generate square pattern printing data within the perimeter of said printing start and end points of said printing area.

7. The circuit for generating a square test pattern as claimed in claim 6, wherein said first conversion means comprises:
longitudinal line generating means for receiving the load signals to control the clock period of said longitudinal line generating means, and for receiving said first intermediate clock signal to generate the printing start and end signals of a printing line, the line clear signal and the longitudinal line printing data; and
printing area establishing means for receiving said printing start and end signals and said first intermediate clock signals to establish the printing start and end points of the printing area.

8. The circuit for generating a square test pattern as claimed in claim 7, wherein said longitudinal line generating means comprises:
plural counter means for receiving the first intermediate clock signals for counting said first intermediate clock signals to produce a plurality of counted values and a carry signal, and for receiving the load signals to control the clock period of said plural counter means; and
logic means for decoding the counted values of said plural counter means to produce printing start and end signals of each line, a line clear signal, and the longitudinal line printing data.

9. A circuit for generating a square test pattern as claimed in claim 7, wherein said longitudinal line generating means comprises:
first counter means for receiving the first intermediate clock signals for counting said first intermediate clock signal to produce a counted value and a carry signal, and for receiving the load signals to control the clock period of said first counter means;
second counter means for receiving said first intermediate clock signals and said carry signal for counting said first intermediate clock signals to produce a second counted value and a second carry signal, and for receiving said load signals to control the clock period of said second counter means;
third counter means for receiving said first intermediate clock signals and said first and second carry signals for counting said divided clock pulses to produce a third counted value, and for receiving said load signals to control the clock period of said third counter means; and
programmable array logic means for decoding the counted values produced by said first, second and third counter to generate a printing start signal, a printing end signal, a line clear signal, and the longitudinal line printing data.

10. A circuit for generating a square test pattern as claimed in claim 6, wherein said second conversion means comprises:
plural counter means for receiving the second intermediate clock signals for counting said second intermediate clock signal to produce a carry signal;
load signal generating means for receiving said carry signal and a printing start signal to produce the load signals for controlling the clock period of said plural counter means; and
dot line generating means for receiving said carry signal and said second intermediate clock signals to produce a traverse line printing data.

11. A circuit for generating a square test pattern as claimed in claim 6, wherein said second conversion means comprises:
first counter means for receiving the second intermediate clock signals for counting said second intermediate clock signals to produce a carry signal;
second counter means for receiving said second intermediate clock signals and said carry signal for counting said second intermediate clock signal to produce a second carry signal;
inverter means for providing an inverted second carry signal;
logic means for receiving said inverted second carry signal and a printing start signal to produce the load signals for controlling the clock pulse period of the first and second counter means;
flip-flop means for receiving said second intermediate clock signals and said second carry signal to produce a two-dot line; and
means for receiving said second carry signal and said two-dot line to produce the traverse line printing data.

12. A method for generating a square test pattern for use in a page printer, comprising the steps of:
generating clock signals;
providing first intermediate clock signals in dependence upon said clock signals;
providing second intermediate clock signals and load signals upon receiving said clock signals and a horizontal synchronizing signal;
using a plurality of counter means to receive said load signals to control the clock period, and receive said first intermediate clock signals to generate a printing start and end signals, a line clear signal, and the longitudinal line printing data;
establishing a printing start and end points of a printing area upon receiving said printing start and end signals and said first intermediate clock signals using a plurality of flip-flop means;
generating the transverse line printing data upon receiving said second intermediate clock signal using a plurality of counter means; and
receiving said longitudinal line printing data and said traverse line printing data to generate square pattern printing data within the perimeter of said printing start and end points of said printing area.

* * * * *

UNITED STATES PATENT AND TRADEMARK OFFICE
CERTIFICATE OF CORRECTION

PATENT NO. : 5,109,478
DATED : 28 April 1992
INVENTOR(S) : Kwang-Young JUNG

It is certified that error appears in the above-identified patent and that said Letters Patent is hereby corrected as shown below:

IN THE CLAIMS

Claim 1, Column 5, Line 24, delete "a";

Line 45, insert a semicolon after "data";

Claim 3, Column 5, Line 65, replace "traverse" with --transverse--;

Line 66, replace "traverse" with --transverse--;

Column 6, Line 6, replace "traverse" with --transverse--;

Line 7, replace "traverse" with --transverse--;

Claim 5, Column 6, Line 30, replace "traverse" with --transverse--;

Line 31, replace "traverse" with --transverse--;

Line 33, replace "traverse" with --transverse--;

Line 35, replace "traverse" with --transverse--;

Line 36, delete the semicolon (second occurrence);

Line 43, replace "traverse" with --transverse--;

Line 47, replace "traverse" with --transverse--;

Claim 6, Column 7, Line 2, replace "traverse" with --transverse--;

UNITED STATES PATENT AND TRADEMARK OFFICE
CERTIFICATE OF CORRECTION

PATENT NO. : 5,109,478
DATED : 28 April 1992
INVENTOR(S) : Kwang-Young JUNG

It is certified that error appears in the above-identified patent and that said Letters Patent is hereby corrected as shown below:

IN THE CLAIMS

Claim 10, Column 8, Line 13, replace "traverse" with --transverse--;

Claim 11, Column 8, Line 34, replace "traverse" with --transverse--;

Claim 12, Column 8, Line 57, replace "traverse" with --transverse--.

Signed and Sealed this

Twenty-fourth Day of August, 1993

Attest:

BRUCE LEHMAN

Attesting Officer     Commissioner of Patents and Trademarks